US005740479A

United States Patent [19]
Soma et al.

[11] Patent Number: 5,740,479
[45] Date of Patent: Apr. 14, 1998

[54] PHOTOGRAPHIC CAMERA

[75] Inventors: Hiroshi Soma; Hiroshi Tsuchitani; Yoji Naka, all of Saitama-ken,, Japan

[73] Assignee: Fuji Photo Film Co., Ltd., Kanagawa-ken, Japan

[21] Appl. No.: 800,750

[22] Filed: Feb. 14, 1997

[30] Foreign Application Priority Data

Feb. 20, 1996 [JP] Japan ..................... 8-031758

[51] Int. Cl.⁶ ........................ G03B 15/05; G03B 17/24
[52] U.S. Cl. ..................... 396/176; 396/315; 396/542
[58] Field of Search ................. 396/311, 315–318, 396/176, 542, 435, 436

[56] References Cited

U.S. PATENT DOCUMENTS

| 3,590,703 | 7/1971 | Ono | 396/317 |
| 4,001,850 | 1/1977 | Fujita | 396/316 |
| 4,994,830 | 2/1991 | Harvey | 396/317 |
| 5,619,737 | 4/1997 | Horning | 396/315 |
| 5,671,458 | 9/1997 | Kubo et al. | 396/436 |

FOREIGN PATENT DOCUMENTS 7-084309  3/1995  Japan.

*Primary Examiner*—W. B. Perkey
*Attorney, Agent, or Firm*—Young & Thompson

[57] ABSTRACT

A photographic camera is provided with a light emission diode which emits light toward a photographic film loaded in the photographic camera in response to shutter release, and a mark recording mechanism which records marks on the film by light emitted from the light emission diode in a number which is changed in response to movement of an external control member which is operated to designate an aspect ratio of a print. The mark recording mechanism includes a light-shielding plate member which is provided with a plurality of windows and is fixed in the camera body with the windows opposed to the photographic film and a rotary light-shielding plate which is disposed between the light-shielding plate member and the light emission diode and is rotated to selectively close and open the windows in response to movement of the external control member.

9 Claims, 7 Drawing Sheets

PHOTOGRAPHIC CAMERA

BACKGROUND OF THE INVENTION

1. Field of the Invention

This invention relates to a photographic camera in which printing instruction for designating the aspect ratio of a photographic print is recorded on a photographic film.

2. Description of the Related Art

Recently there have been offered photographic prints having various aspect ratios in order to make photography more enjoyable to people. Amongst such formats, there have been known a panoramic print whose aspect ratio is 2.83, a high-vision print whose aspect ratio is 1.78, and a format approximating the aspect ratio of the screen of high definition television and the like, in addition to a standard print whose aspect ratio is 1.42.

Further there has been proposed a photographic camera in which printing instructions for designating the aspect ratio of a photographic print is recorded on a photographic film as disclosed, for instance, in Japanese Unexamined Patent Publication No. 4(1992)-328537. In such a camera, when, for instance, the panoramic size is selected, a code signal plate for the panoramic size is inserted into the optical path of light from an object which impinges upon the photographic film through a taking lens and the shape of the code signal plate is recorded in the exposure as a code for designating the panoramic size.

Further, as disclosed in Japanese Unexamined Patent Publication No. 54(1979)-26721, there has been known a photographic camera in which trimming information is recorded on photographic film so that an enlarged photographic print which appears to have been taken through a zoom lens can be obtained. In this camera, a number of light emission diodes to the number corresponding trimming sizes are arranged below the aperture of the camera at different intervals and are selectively illuminated to the trimming size selected, whereby trimming information is recorded on an edge portion of the film as marks. Upon printing, the trimming information is read on the basis of the number of the marks on the film and the distance therebetween, and a zoom lens of the printer is driven according to the trimming information so that a photographic print at a desired angle of view can be obtained.

However the photographic camera in which the printing instruction is recorded on the film by use of part of light from the object is disadvantageous in that the density of the recorded information fluctuates according to the photographing conditions. For example, when the light from the object is weak, the recorded information becomes too blurred to distinguish it.

Further the camera where marks representing the printing instruction is recorded on the film by use of a plurality of light emission diodes is disadvantageous in that an exclusive circuit for driving the light emission diodes in synchronization with the shutter becomes necessary, which adds to the manufacturing cost of the camera, though density of the recorded information is not affected by the photographing conditions.

Further, as disclosed in Japanese Unexamined Patent Publication No. 7(1995)-84309, there has been proposed a photographic camera in which a single light emission diode is provided in the camera body and a light-shielding plate as provided between the light emission diode and the film. The plate is slid, by operation of an external control member, between a first position where it blocks light from the light emission diode so that no mark is recorded on the film, a second position where light from the diode can impinge upon the film through a single window, thereby recording a single mark on the film and a third position where light from the diode can impinge upon the film through a pair of windows, thereby recording a pair of marks on the film. This arrangement is disadvantageous in that the stroke of the light-shielding plate is long, which adds to the size of the camera.

SUMMARY OF THE INVENTION

In view of the foregoing observations and description, the primary object of the present invention is to provide a photographic camera with a printing instruction recording mechanism which is simple in structure, can be produced at low cost and can clearly record printing instruction for designating the aspect ratio of a printing area on a photographic film.

The photographic camera of the present invention is characterized by having a mark recording mechanism which comprises a light-shielding plate member which is provided with a plurality of windows and is fixed in the camera body with the windows opposed to a photographic film loaded in the camera and a rotary light-shielding plate which is disposed between the light-shielding plate member and a light emission member and is rotated to selectively close and open the windows in response to movement of an external control member.

In one embodiment of the present invention, the light emission member is held on a printed circuit board and is inserted into a light-shielding tubular member from one end thereof, the tubular member opening at the other end toward the space in which said rotary light-shielding plate rotates, and a light-shielding member which closes said one end of the tubular member is provided on the portion of the printed circuit board on which the light emission member is held.

A strobe light may be mounted on the printed circuit board.

In the photographic camera of the present invention, since the rotary type light-shielding plate is employed, the light-shielding plate can be moved among the positions where, for instance, it closes one of two windows of the light-shielding plate member (thereby recording one mark on the film), closes both the windows (thereby recording no mark) and closes neither of the windows (thereby recording two marks) in a relatively narrow space, whereby the camera can be compact in size. Further so long as the light-shielding plate has a sufficient area, light emitted from the light emission member cannot impinge upon the film by passing the light-shielding plate to record incorrect information.

When the light emission member is held on a printed circuit board and is inserted into a light-shielding tubular member from one end thereof which tubular member opens at the other end toward the space in which the rotary light-shielding plate rotates, and a light-shielding member which closes said one end of the tubular member is provided on the portion of the printed circuit board on which the light emission member is held, the light-shielding member prevents light emitted from a strobe light provided on the camera body from reaching the film through the windows and accordingly both the light emission member and the strobe light can be mounted on a single printed circuit board, whereby the electric circuit system can be simplified.

DESCRIPTION OF THE PREFERRED EMBODIMENT

Figure 1:
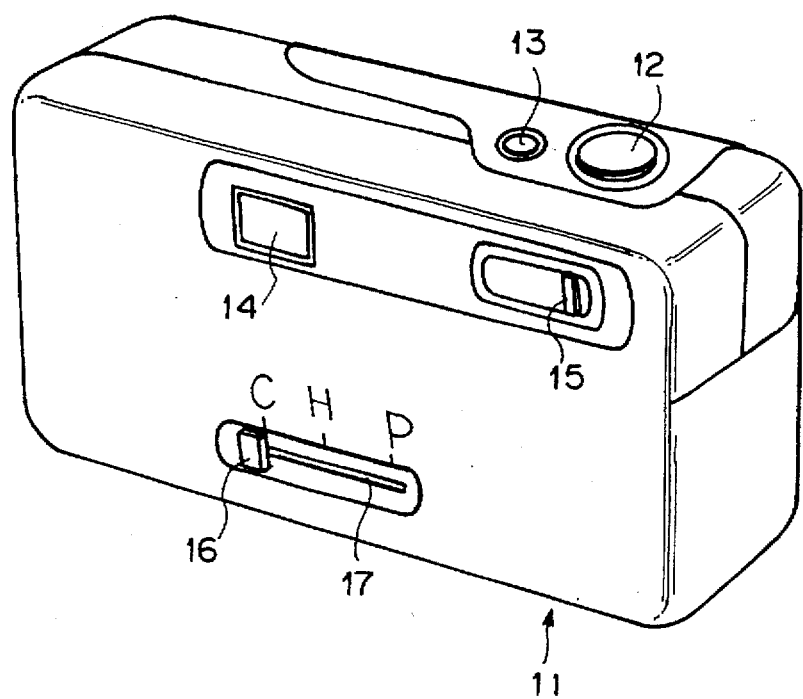
FIG. 1 is a perspective view of a photographic camera in accordance with an embodiment of the present invention as viewed from the rear side of the camera.

In FIG. 1, a photographic camera in accordance with an embodiment of the present invention has a camera body 11. A shutter release button 12 and a frame counter window 13 are disposed on the upper surface of the camera body 11, and an eyepiece window 14 for a viewfinder, a film rewind release button 15 and a print mode setting knob 16 are disposed on the rear side of the camera body 11. The print mode setting knob 16 is slid along a slit 17 and print mode indicating figures "C", "H" and "P" are stamped along the slit 17.

When the print mode setting knob 16 is pointed at C, standard (conventional) print mode is selected, when the knob 16 is pointed at H, high-vision print mode is selected and when the knob 16 is pointed at P, panoramic print mode is selected.

Figure 2:
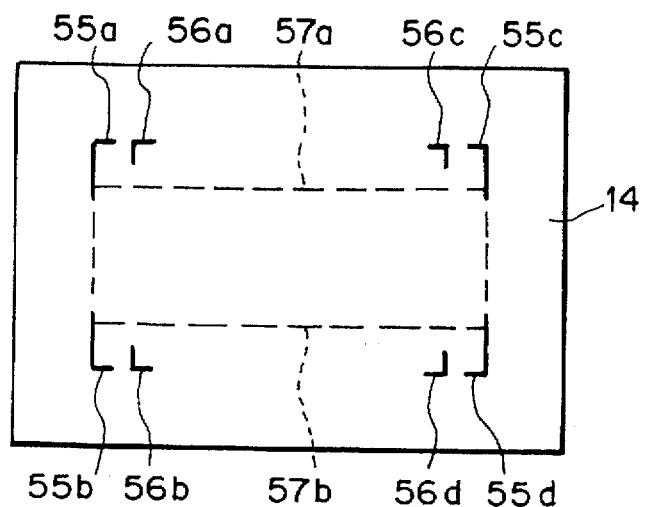
FIG. 2 is a view showing the field of view of the viewfinder of the camera.

Though not shown, a taking lens, a viewfinder window and a stroboscope are disposed on the front surface of the camera body 11. As shown in FIG. 2, four marks 55a to 55d indicating the four corners of the high-vision size frame are provided in the field of view of the eyepiece window 14 of the viewfinder and four marks 56a to 56d indicating the four corners of the standard size frame are provided inside the four marks 55a to 55d. Further a pair of parallel broken lines 57a and 57b indicate the panoramic size frame.

Figure 3:
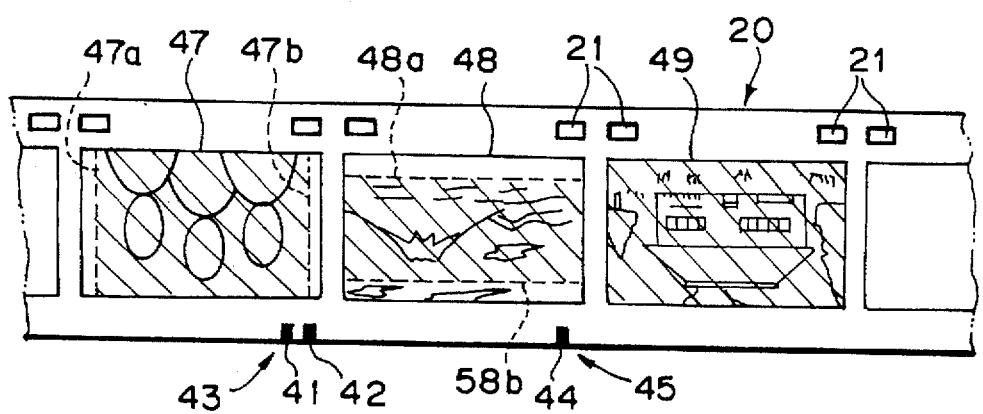
FIG. 3 is a view showing a part of a photographic film recorded with marks.

FIG. 3 shows a part of photographic film 20 to be loaded in the photographic camera of this embodiment. The film 20 is formatted film having a perforation on each end of each frame and is contained in a cartridge (not shown). The film aperture of the camera is set so that each frame is exposed in a full size which is 15.6 mm×27.4 mm as measured on the film 20 irrespective of the print mode selected. The aspect ratio of the full size is 1.76 and is substantially equal to that of the high-vision size frame (1.78).

Figure 4:
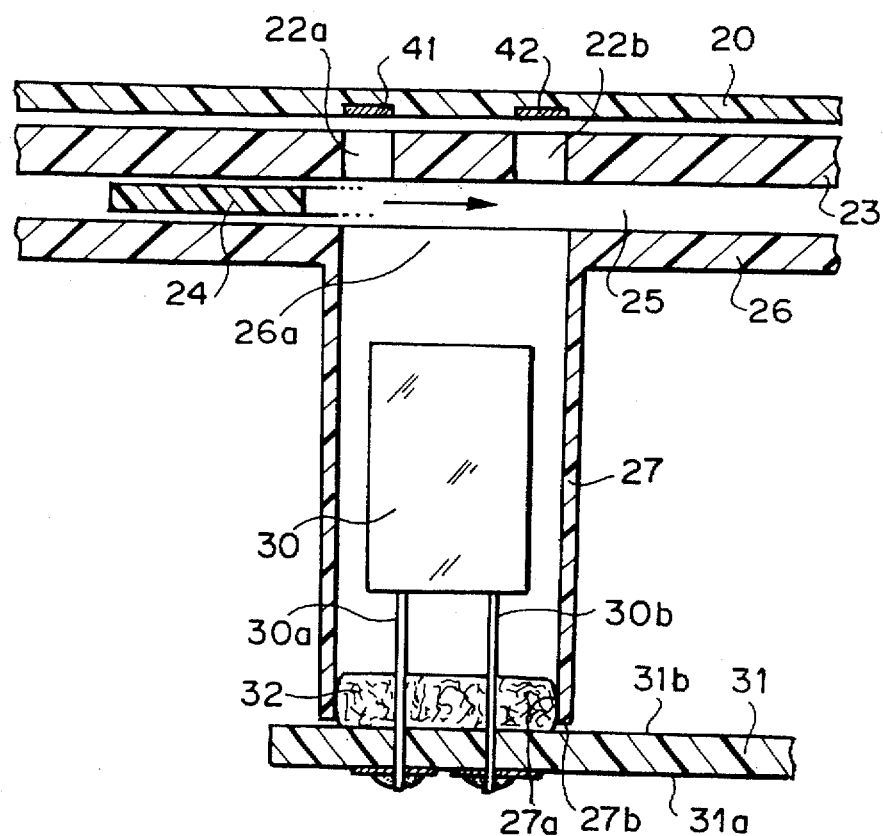
FIG. 4 is a cross-sectional view showing the position of the light-shielding plate in which a pair of marks are recorded on the film, and the light emission diode mounting structure.
Figure 6:
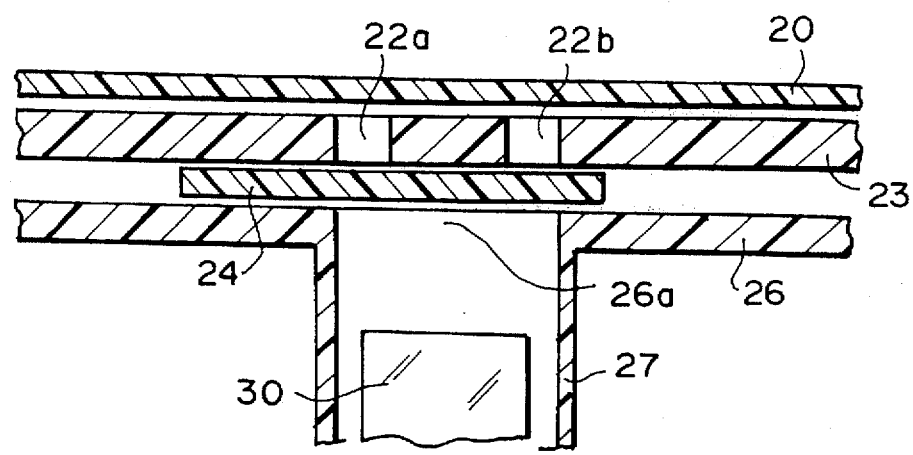
FIG. 6 is a fragmentary cross-sectional view showing the position of the light-shielding plate when no mark is to be recorded on the film.
Figure 7:
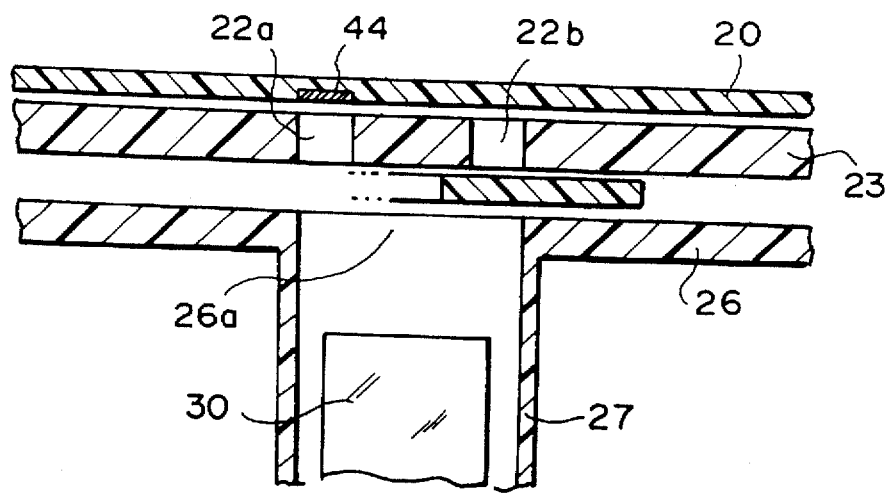
FIG. 7 is a fragmentary cross-sectional view showing the position of the light-shielding plate when one mark is to be recorded on the film.

As shown in FIG. 4, a light-shielding plate member 23 is fixed in the rear side portion of the camera body 11 to extend along the film 20 close to the film 20. A pair of windows 22a and 22b are formed in the light-shielding plate member 23 opposed to the lower edge portion of the film 20. A sectoral light-shielding plate 24 which is rotated by the print mode setting knob 16 is disposed close to the side of the light-shielding plate member 23 remote from the film 20. The sectoral light-shielding plate 24 is rotated among a plurality of positions where it selectively closes the windows 22a and 22b in the light-shielding plate member 23 as will be described in detail later. In FIG. 4, the sectoral light-shielding plate 24 is in a position where it closes neither of the windows 22a and 22b. In FIGS. 6 and 7, the sectoral light-shielding plate 23 is in other positions. In FIGS. 4, 6 and 7, the film 20 and the plate members are shown thicker than the real dimensional ratio.

A second light-shielding plate member 26 is fixed to the camera body 11 to extend in parallel to the first light-shielding plate member 23 in front of the member 23 (on the lower side as seen in FIG. 4) with a space 25 intervening therebetween. The sectoral light-shielding plate 24 is rotated in the space 25. A light-shielding tubular member 27 having an inner space which is rectangular in cross-section is formed integrally with the second light-shielding plate member 26 to extend forward normal to the second light-shielding plate member 26. The rear end of the tubular member 27 opens toward the windows 22a and 22b in the first light-shielding plate member 23 at an opening 26a formed in the second light-shielding plate member 26. A light emission diode 30 is inserted into the tubular member 27 from an opening 27a on the front end of the tubular member 27.

The opening 27a at the front end of the tubular member 27 is closed by a printed circuit board 31 mounted in the front side portion of the camera body 11. The printed circuit board 31 is for a circuit for a strobe light and a strobe light 52 is mounted on the printed circuit board 31 at one corner thereof. The front surface (the lower surface as seen in FIG. 4) 31a of the printed circuit board 31 is a soldering surface.

A light-shielding member 32 of a black foamed material is fitted in the opening 27a of the tubular member 27 and terminal pins 30a and 30b of the light emission diode 30 extends through the light-shielding member 32 and through the printed circuit board 31 from the rear surface 31b thereof and project forward from the front surface of the printed circuit board 31. The projecting ends of the terminal pins 30a and 30b of the light emission diode 30 are soldered to the front surface of the printed circuit board 31, whereby the light emission diode 30 is mechanically held by the printed circuit board 31 and at the same time electrically connected to the same. Thus the light emission diode 30 is energized by the strobe light drive circuit. The light-shielding member 32 completely closes the opening 27a of the tubular member 27 so that external light is prevented from entering the inner space of the tubular member 27 even if a space is generated between the end face 27b of the tubular member 27 and the rear surface 31b of the printed circuit board 31.

Figure 5A:
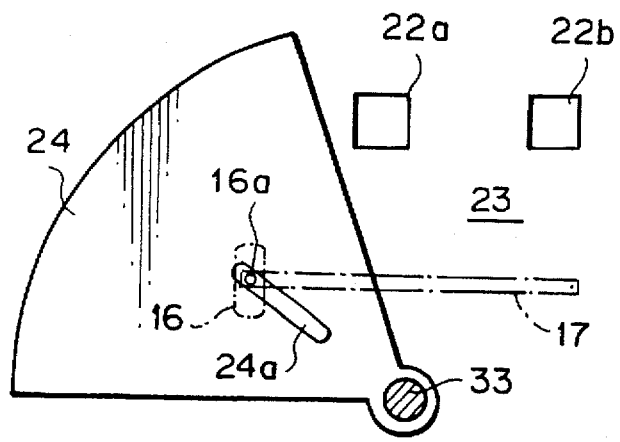
FIGS. 5A to 5C show the relation between the position of the print mode setting knob and opening and closure of the windows.
Figure 5B:
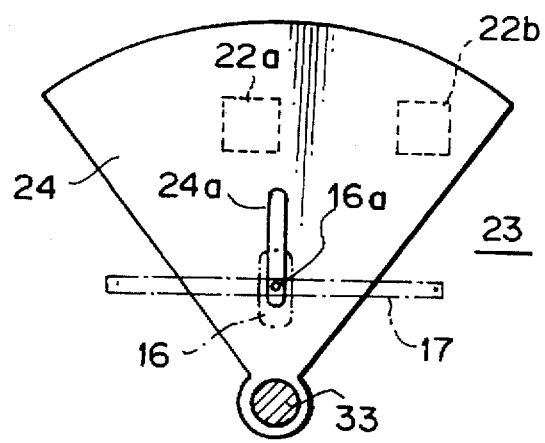
Figure 5C:
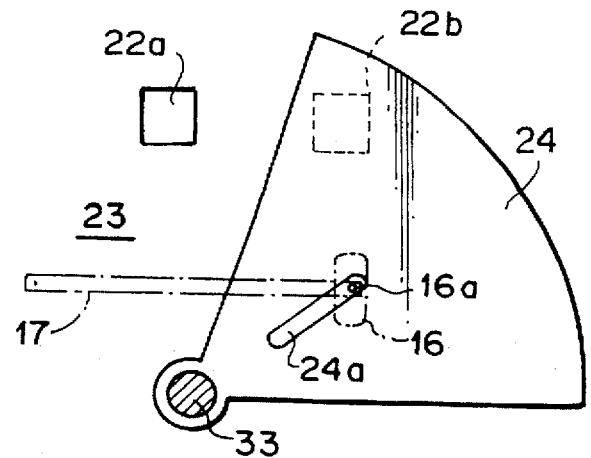

As shown in FIGS. 5A to 5C, the sectoral light-shielding plate 24 is supported for rotation about a pivot pin 33 and is provided with an elongated slit 24a extending in a radial direction thereof. A shaft 16a of the print mode setting knob 16 is received in the slit 24a so that the light-shielding plate 24 is rotated as the knob 16 slides along the slit 17.

FIG. 5A shows the position of the light-shielding plate 24 when the print mode setting knob 16 is pointed at C. In this state, the light-shielding plate 24 closes neither of the windows 22a and 22b and accordingly when the light emission diode 30 is turned on in this state, light emitted from the diode 30 impinges upon the lower edge portion of the film 20 through the two windows 22a and 22b, whereby two dot marks 41 and 42 (FIG. 3), which form a print instruction code 43 designating the standard aspect ratio, are recorded on the film 20.

FIG. 5B shows the position of the light-shielding plate 24 when the print mode setting knob 16 is pointed at H. In this state, the light-shielding plate 24 closes both the windows 22a and 22b and accordingly when the light emission diode 30 is turned on in this state, light emitted from the diode 30 cannot impinge upon the film 20, whereby no dot mark is recorded on the film 20, which forms a print instruction code designating the high-vision aspect ratio.

FIG. 5C shows the position of the light-shielding plate 24 when the print mode setting knob 16 is pointed at P. In this state, the light-shielding plate 24 closes only the window 22b and accordingly when the light emission diode 30 is put on in this state, light emitted from the diode 30 impinges upon the film 20 through the window 22a, whereby one dot mark 44 is recorded on the film 20, which form a print instruction code 45 designating the panoramic aspect ratio.

As can be understood from the description above, in this embodiment, since the rotary type light-shielding plate 24 is employed, the light-shielding plate 24 can be moved among the positions shown in FIGS. 5A to 5C in a relatively narrow space, whereby the camera can be compact in size. Further so long as the light-shielding plate 24 has a sufficient area, light emitted from the diode 30 cannot impinge upon the film 20 by passing the light-shielding plate 24 to record incorrect information in the state shown in FIG. 5B or 5C.

While selecting a print mode by operation of the print mode setting knob 16, photographs are taken and then the film 20 is rewound into the cartridge.

Zero, one or two black dot marks are recorded on the developed film 20 for each frame outside the exposure according to the print mode selected. When printing, the print instruction code formed of the dot mark(s) is visually or automatically read.

The exposure 49 provided with no dot mark is printed on a photographic paper at a high-vision aspect ratio. In the case of the exposure 47 provided with two dot marks, the part of the object image between the broken lines 47a and 47b in FIG. 3 is printed on a photographic paper, whereby a standard aspect ratio print is obtained. In the case of the exposure 48 provided with one dot mark, the part of the object image between the broken lines 48a and 48b in FIG. 3 is printed on a photographic paper, whereby a panoramic aspect ratio print is obtained.

Since the dot marks 41, 42 and 44 are recorded outside of each frame, each exposure may be printed at any aspect ratio other than that designated by the print instruction code for the exposure. Further though, in the embodiment described above, marks for indicating the frames of the respective sizes are only shown in the field of view of the eyepiece window 14 of the viewfinder, a mask may be provided to change the field of view in response to movement of the print mode setting knob 16.

Figure 8:
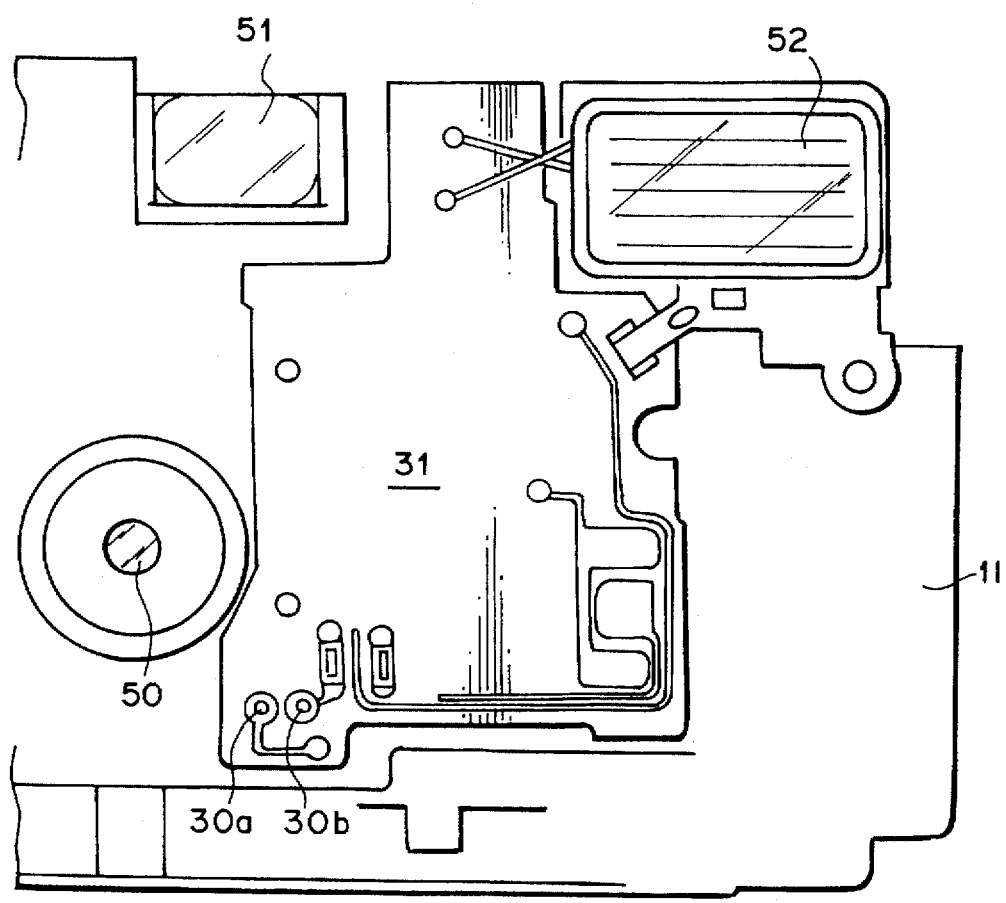
FIG. 8 is a fragmentary front view showing an example of the printed circuit board mounting structure with the front cover of the camera body removed.
Figure 9:
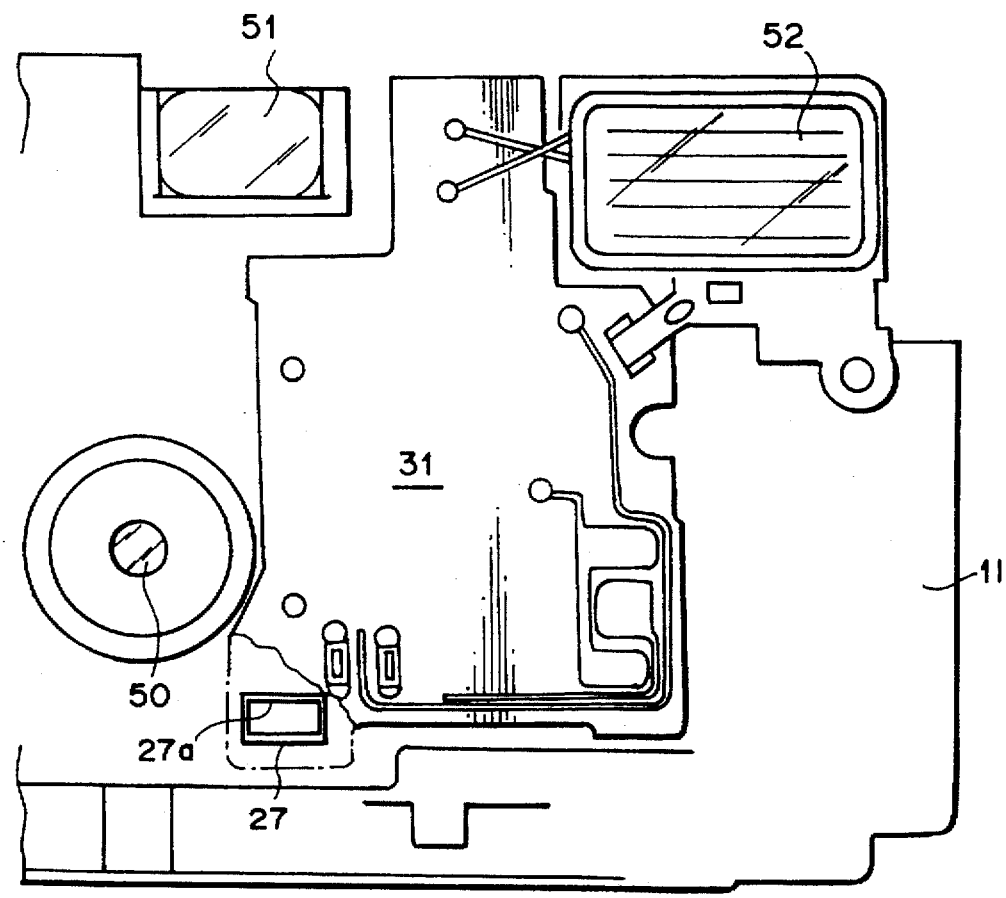
FIG. 9 is a view similar to FIG. 8 but with the light emission diode holding portion of the printed circuit board removed.

FIG. 8 is a fragmentary front view showing an example of the printed circuit board mounting structure with the front cover of the camera body 11 removed, and FIG. 9 is a view similar to FIG. 8 but with the light emitting diode holding portion of the printed circuit board 31 removed. In FIGS. 8 and 9, reference numerals 50 and 51 respectively denote a taking lens and a viewfinder. The electric circuit pattern on the printed circuit board 31 is partly abbreviated.

Since the portion of the printed circuit board 31 on which the light emission diode 30 is mounted is provided with the light-shielding member 32 which closes the opening 27a of the tubular member 27, the light emission diode 30 can be mounted on the printed circuit board 31 for the strobe light 52 without fear that light emitted from the strobe light 52 reaches the film 20, whereby the electric circuit system can be simplified.

What is claimed is:

1. A camera, comprising:
   a light emitting member which emits light toward photographic film loaded in the camera, the light emission taking place in accordance with release of a camera shutter;
   a mark recording mechanism to optically record marks on the film using light emitted by the light emitting member, the mark recording mechanism including a plate which is capable of selectively preventing light emitted by the light emitting member from reaching the film; and
   an external switch operable by a user to control operation of the mark recording mechanism, wherein
   the plate is generally sector-shaped with two radial edges and one arcuate edge, the plate being movably disposed within the camera to pivot about a point located near a vertex of the two radial edges.

2. The camera of claim 1, wherein the external switch is a linearly operating slide switch.

3. The camera of claim 2, wherein the external switch contacts the plate through a pin extending from the switch through a rear body surface of the camera, the rear body surface of the camera having a switch slot through which the pin travels as the switch is moved between various positions, the pin penetrating a pin slot in the plate which runs generally radially along the plate, and wherein
   the pin slot, switch slot, and pivot point of the plate are arranged such that movement of the external switch from one end of its linear travel to an opposite end causes the plate to pivot about the pivot point as the pin slides from a radially outer end of the plate slot to a radially inner end of the plate slot and back to the radially outer end of the plate slot.

4. The camera of claim 3, further comprising a stationary panel disposed adjacent to the film, the stationary panel having a plurality of apertures through which the marks are formed, wherein the plate is disposed adjacent to the panel and rotates through a plane parallel to the panel, the plate being positionable to selectively cover all of the apertures, none of the apertures, or a subset of the apertures.

5. The camera of claim 4, wherein the arcuate portion of the plate which passes across the apertures has an arcuate length of at least five times a width of each of the apertures.

6. The camera of claim 5, wherein the light emitting member is disposed at a first end of a light-shielding tubular member, the tubular member opening at a second end adjacent to a side of the plate opposite the stationary panel.

7. The camera of claim 6, further comprising:
   a printed circuit board upon which the light emitting member is disposed; and
   a light-shielding member disposed between the light emitting member and the printed circuit board, the light-shielding member preventing light produced by the light emitting member from passing between the light-shielding tubular member and the printed circuit board.

8. The camera of claim 7, further comprising an electronic flash unit mounted on the printed circuit board.

9. The camera of claim 8, wherein an angle between the radial edges of the plate is between 65° and 80°.

* * * * *